(12) United States Patent
Hunter et al.

(10) Patent No.: US 7,088,397 B1
(45) Date of Patent: Aug. 8, 2006

(54) IMAGE SENSOR PACKAGING WITH IMAGING OPTICS

(75) Inventors: Andrew Arthur Hunter, Bristol (GB); James-Yu Chang, Cupertino, CA (US); Park-Kee Yu, San Jose, CA (US); Ray Schuder, Menlo Park, CA (US)

(73) Assignee: Avago Technologies General IP Pte. Ltd, Singapore (SG)

( * ) Notice: Subject to any disclaimer, the term of this patent is extended or adjusted under 35 U.S.C. 154(b) by 1430 days.

(21) Appl. No.: 09/715,794

(22) Filed: Nov. 16, 2000

(51) Int. Cl.
*H04N 5/225* (2006.01)

(52) U.S. Cl. .................. 348/374; 250/239; 257/433

(58) Field of Classification Search .............. 348/335, 348/340, 373, 374; 257/291, 294, 433; 250/216, 250/239; 24/545, 457; 292/17, 80, 253
See application file for complete search history.

(56) References Cited

U.S. PATENT DOCUMENTS

| | | | |
|---|---|---|---|
| 4,594,613 A * | 6/1986 | Shinbori et al. ............ 348/340 |
| 5,007,854 A * | 4/1991 | Crespiatico et al. ........ 439/367 |
| 5,302,778 A * | 4/1994 | Maurinus ................... 174/52.4 |
| 5,400,072 A | 3/1995 | Izumi et al. ................ 348/335 |
| 5,424,531 A | 6/1995 | O'Regan et al. ............ 250/216 |
| 5,495,114 A * | 2/1996 | Adair .......................... 257/59 |
| 6,359,652 B1* | 3/2002 | Takada ....................... 348/374 |
| 6,518,656 B1* | 2/2003 | Nakayama et al. ......... 257/680 |
| 6,693,674 B1* | 2/2004 | Wataya et al. .............. 348/373 |
| 2003/0137595 A1* | 7/2003 | Takachi ...................... 348/340 |

* cited by examiner

*Primary Examiner*—Ngoc-Yen Vu
*Assistant Examiner*—Chriss S. Yoder

(57) ABSTRACT

A digital image capture system includes an image sensor, a package structure for holding the image sensor, and electrical connectors for creating electrical connections between the image sensor and a circuit board. The package structure includes attachment features that enable an optics system to be securely attached to the package structure after the package structure has been soldered to the circuit board In an embodiment, the attachment features align the optics system with the image sensor without having to power up the image sensor. An embodiment of the attachment features includes mechanical attachment features, such as clip arms and/or clip receivers. In an embodiment, the optics system includes attachment features that are complementary to the attachment features of the package structure. The package structure and optics system may additionally include complementary contact surfaces that create a light-tight connection between the optics system and the package structure.

9 Claims, 2 Drawing Sheets

IMAGE SENSOR PACKAGING WITH IMAGING OPTICS

FIELD OF THE INVENTION

The invention relates generally to digital image capture systems, and more particularly to the packaging of image sensors in conjunction with imaging optics.

BACKGROUND OF THE INVENTION

Digital cameras, either still or video, utilize image sensors to capture digital image information. As with conventional film based cameras, digital cameras include imaging optics to focus light onto the image capture medium.

In order to reduce assembly time and cost for high volume digital cameras, it is important that the number of circuit boards required to mount all of the components, including the image sensor and imaging optics, be kept to a minimum and that the components have as small a footprint as possible. In addition, it is important that the electronic components can be attached to the circuit boards utilizing standard automated mounting techniques, such as widely utilized surface mounting techniques.

It is also important in digital camera applications that the imaging optics be accurately aligned with the image sensor so that the image bearing light is focused onto the image sensor. One technique for accurately aligning the imaging optics with the image sensor involves powering up the image sensor and adjusting the location of the imaging optics in response to a detected image. Powering up the image sensor to align the imaging optics is time consuming and requires specialized alignment equipment. Other techniques for accurately aligning the image sensor with the imaging optics do not involve powering up the image sensor.

Various digital image capture systems having an image sensor and imaging optics that can be aligned without powering up the imaging sensor have been adapted for high volume camera production. FIG. 1 depicts a first prior art digital image capture system which has an image sensor package 102 that is surface mounted to a circuit board 104, with the circuit board being attached to the outer case 106 of a digital camera. The imaging optics 108 are also connected to the outer case of the digital camera in a manner which allows image bearing light to contact an image sensor. The digital image capture system of FIG. 1 includes the outer case, the printed circuit board, the image sensor package, an image sensor chip 110, package leads 112, an image sensor cover glass 114, a lens holder 118, lens elements 120, a lens aperture 122, and an infra-red filter 124. Although the arrangement of image capture elements works well, accurate alignment of the lens elements with the image sensor is made difficult because of the distance between the lens elements and the image sensor and because the outer case typically has slight flexibility that can change the alignment. In addition, the outer case must be light-tight to ensure that unwanted light does not reach the image sensor.

FIG. 2 depicts a second prior art digital image capture system in which an image sensor package 202 is attached to a circuit board 204 and imaging optics 208 are attached directly to the same circuit board around the outer edges of the image sensor package. The digital image capture system of FIG. 2 includes the circuit board, the image sensor package, an image sensor chip 210, connection leads 212, an image sensor cover glass 214, a light shield 226, an infra-red filter 224, a filter retaining ring 228, a lens attachment structure 230, lens attachment screws 232, a lens holder 218, lens elements 220, and a lens aperture 222. Although the arrangement of image capture elements works well, the circuit board must be designed and built with precisely aligned attachment holes for attaching the imaging optics. Even with precisely aligned attachment holes for the imaging optics, the image sensor package must be mounted on the circuit board with precise accuracy in order to ensure alignment between the imaging optics and the image sensor. In addition, the attachment structure of the imaging optics extends beyond the outer edges of the image sensor package, thereby taking up valuable circuit board real estate.

FIG. 3 depicts a third prior art digital image capture system in which an alignment plate 334 is utilized to ensure alignment between an image sensor package 302 and imaging optics 308. The digital image capture system includes a circuit board 304, the alignment plate, the image sensor package, an image sensor chip 310, connection leads 312, an image sensor cover glass 314, a light shield 326, an infra-red filter 324, a filter retaining ring 328, a lens attachment structure 330, connection nuts 340 and bolts 342, a lens holder 318, lens elements 320, and a lens aperture 322. The alignment plate is located between the circuit board and the image sensor package and the imaging optics. The alignment plate includes through holes that enable the connection leads of the image sensor package to connect to the circuit board. The alignment plate also includes through holes for aligning and attaching the lens attachment structure to the circuit board. Because the image sensor package and the lens attachment structure are aligned with the alignment plate, the image sensor chip and the imaging optics are indirectly aligned with each other. Although the arrangement of image capture elements works well to improve the alignment problem described with reference to the image capture system of FIG. 2, the alignment plate is not compatible with surface mounting techniques that are utilized to attach image sensing packages in high volume assembly processes. In addition, the alignment plate adds extra cost to the image capture system.

In all of the above-described digital image capture systems, the image sensor is sealed within a package cavity by a cover glass. The cover glass protects the image sensor from damage while the image sensor package is soldered to the circuit board. Other techniques for attaching and aligning imaging optics with an image sensor involve attaching the imaging optics directly to a surface of the image sensor. While this provides some advantages, the imaging optics must be attached to the image sensor in a clean-room environment because the image sensor is very sensitive to environmental contaminants. Because the imaging optics must be attached to the image sensor in a clean-room environment, the imaging optics are typically attached to the image sensor before the image sensor is soldered to a circuit board. In order to minimize the exposure of the image sensor and the imaging optics to the high temperatures required for surface mounting techniques, some image sensor packages and imaging optics are through hole mounted to the circuit boards and soldered from the back, often by labor intensive hand soldering.

The description of prior art image capture systems is not meant to be exhaustive although it does highlight some of the problems involved with assembling image capture systems, such as high volume digital cameras, that utilize image sensor chips and imaging optics. In view of the problems involved with assembling image capture systems, what is needed is an economic technique for assembling an image capture system that ensures precise alignment between the image sensor and the imaging optics without having to power up the image sensor, without exposing the image sensor to contaminants, and without exposing the imaging optics to the high temperatures of the surface mounting process.

SUMMARY OF THE INVENTION

An embodiment of a digital image capture system includes an image sensor, a package structure for holding the image sensor, and electrical connectors for creating electrical connections between the image sensor and a circuit board. The package structure includes attachment features that enable the optics system to be securely attached to the package structure after the package structure has been soldered to the circuit board. The optics system can be attached directly to the package structure after the surface mounting process is complete to create a light-tight connection between the package structure and the optics system. In addition, the attachment features can align the optics system with the image sensor without having to power up the image sensor.

An embodiment of the attachment features includes mechanical attachment features, such as clip arms and/or clip receivers. In an embodiment, the image sensor is sealed within a cavity of the package structure by a transparent cover.

The package structure may additionally include a contact surface that is complementary to a contact surface of the optics system and alignment features, separate from the attachment features, that allow the optics system to be aligned with the image sensor.

Another embodiment of a digital image capture system includes an image sensor package and an optics system connected to the image sensor package. The image sensor package includes an image sensor, a package structure for holding the image sensor, and electrical connectors for creating electrical connection between the image sensor and a circuit board. The package structure includes attachment features for attaching the optics system to the image sensor. The optics system includes a lens and a lens holder structure for holding the lens. The lens holder structure includes attachment features for attaching the optics system to the image sensor.

Another embodiment of a digital image capture system includes a circuit board, an image sensor package connected to the circuit board, and an optics system connected to the image sensor package. The circuit board includes electrical contact points. The image sensor package includes an image sensor, a package structure for holding the image sensor, and electrical connectors that are attached to the electrical contact points of the circuit board to create electrical connections between the image sensor and the circuit board. The package structure includes attachment features for attaching the optics system to the image sensor. The optics system includes a lens and a lens holder structure for holding the lens. The lens holder structure includes attachment features for attaching the optics system to the image sensor.

An advantage of the above described digital image capture systems is that an image sensor package can be soldered to a circuit board using conventional surface mounting techniques before the optics system is attached to the image sensor package. The optics system can then simply be "clipped" onto the image sensor package into a position that automatically aligns the optics system with the image sensor.

DETAILED DESCRIPTION

Figure 1:
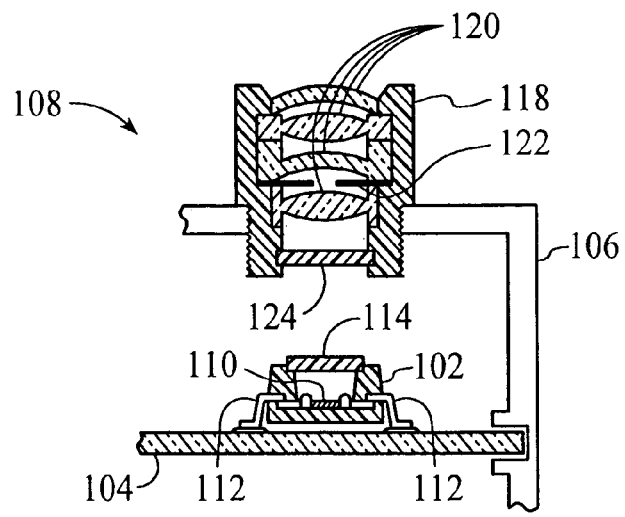
FIG. 1 is an example depiction of a prior art digital image capture system in which a circuit board and imaging optics are attached to the outer case of a digital camera.
Figure 2:
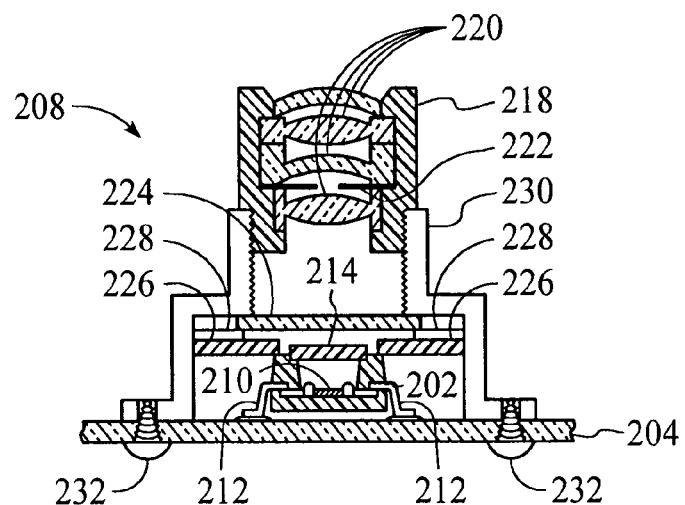
FIG. 2 is an example depiction of a prior art digital image capture system in which imaging optics are attached to the same circuit board as an image sensor package.
Figure 3:
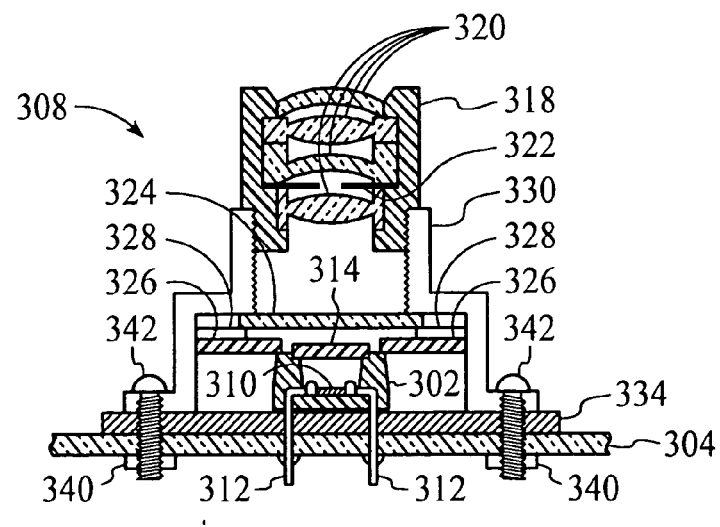
FIG. 3 is an example depiction of a prior art digital image capture system in which an alignment plate is utilized to ensure alignment between an image sensor package and imaging optics.
Figure 4A:
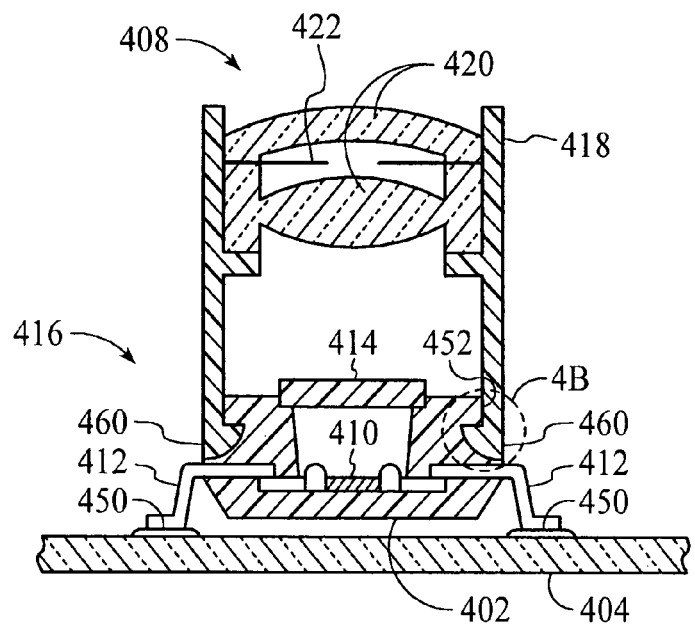
FIG. 4A is a depiction of an image capture system in which imaging optics are directly connected to a surface mounted image sensor package in accordance with an embodiment of the invention.

FIG. 4A is a depiction of an image capture system in which imaging optics are directly connected to a surface mounted image sensor package. The image capture system includes a circuit board 404, an image sensor package 416, and an optics system 408. Each of the elements and respective sub-elements are described in detail below.

The circuit board 404 includes a conventional circuit board that is utilized in image capture applications such as hand-held digital cameras. In an embodiment, electronic components, such as image sensor packages, are connected to electrical contact points 450 on the circuit board utilizing known surface mounting techniques. In a preferred embodiment, the electronic components are attached with automated soldering processes that subject the circuit board and components to temperatures that are too high for many plastic optical lens components.

The image sensor package 416 includes a package structure 402, an image sensor 410, connection leads 412, and a transparent cover 414. The image sensor, the connection leads, and the transparent cover include elements that are known in the field of digital image capture systems. In an embodiment, the transparent cover includes a protective barrier that protects the transparent cover from damage during assembly. The protective barrier is removed before the optics system 408 is attached. As is described below, the protective barrier may be attached to the package structure via the same attachment features that are utilized to attach the optics system to the image sensor package.

The package structure 402 houses the image sensor 410 and supports the connection leads 412 that electrically connect the image sensor to the circuit board 404. The package structure prevents unwanted light from reaching the image sensor and allows image bearing light to reach the image sensor only through the transparent cover 414. The package structure may be made of known packaging materials such as plastic or ceramic.

The package structure 402 is designed to create a connection between the package structure and the optics system 408 that is light-tight and that accurately aligns the optics system with the image sensor 410. In order to create a connection that is light-tight and that accurately aligns the optics system with the image sensor the package structure includes a contact surface 452, or surfaces, and attachment features. The package structure may also include alignment features that help to accurately align the optics system with the package structure. As will become apparent, some portions of the package structure may serve multiple roles, such as part contact surface(s) and part alignment feature, or part attachment feature and part attachment feature.

Figure 4B:
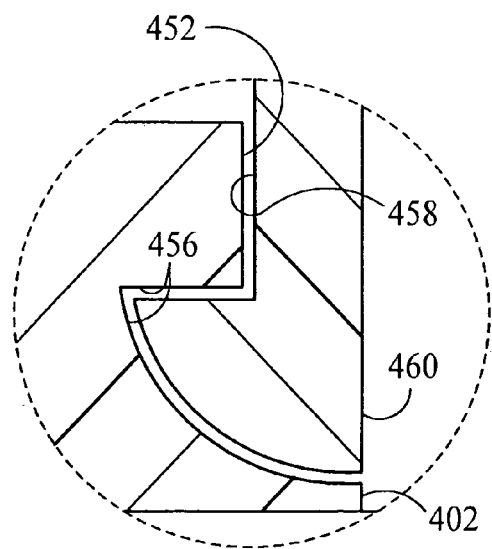
FIG. 4B is an expanded depiction of contact surfaces, alignment features, and attachment features of the package structure and optics system shown in FIG. 4A.

The contact surface 452 of the package structure 402 is a surface that is formed to create a light-tight connection between the package structure and the optics system 408. Referring to FIG. 4B, in an embodiment, the contact surface includes a continuous surface around the package structure that is complimentary to a contact surface 458 of the optics system. That is, the contact surface of the package structure fits directly against an opposite contact surface of the optics system. In an embodiment, the contact surface, or surfaces, of the package structure may include seals or irregularities, such as dark color baffles, that ensure a light-tight and secure connection between the image sensor package 416 and the optics system. Baffles may be used to ensure that leaking light is reflected one or more times and a dark color is used to ensure that light is absorbed and not reflected.

Figure 4C:
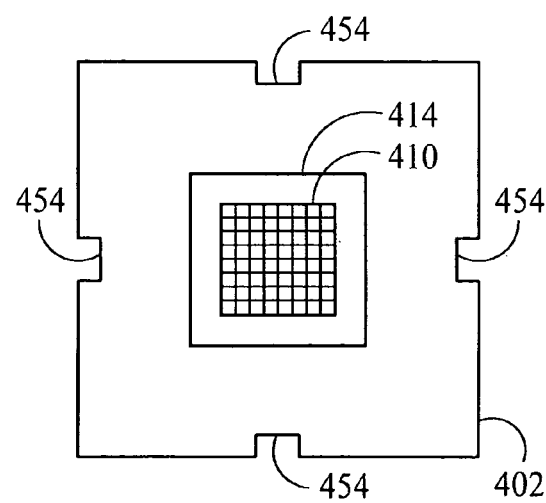
FIG. 4C is a top view of the package structure of FIG. 4A that shows the alignment/attachment features.

The attachment features are features of the package structure 402 that enable the optics system 408 to be securely attached to the image sensor package 416. In an embodiment, the attachment features may include exterior and/or interior features such as clips and/or clip receivers. As shown in FIGS. 4A–4C, the package structure includes clip receivers 454 and 456 on the exterior of the package structure that are formed to fit clip arms 460 of the optics system. It should be noted that although specific attachment features are shown in FIGS. 4A–4C, other arrangements of attachment features may be utilized to attach the optics system to the image sensor package. In an embodiment, the attachment features of the package structure may be separate from alignment features. Although the above-described contact surface helps to create a light-tight connection between the package structure and the optics system, a package structure having attachment features and no control surface is possible.

The alignment features of the package structure are features that cause the optics system to be accurately aligned with the image sensor once the optics system is attached to the package structure. In an embodiment, the alignment features may include mechanical alignment features and/or optical alignment features. Example mechanical alignment features include notches, grooves, flat surfaces, protrusions, etc. that are complementary to mechanical alignment features of the optics system. Example optical alignment features may include optically detectable markings or notches that are optically aligned with complementary features on the optics system. FIG. 4C is a top view of the package structure of FIG. 4A in which alignment features 454 of the package structure include four notches in the package structure that form clip receivers. The clip receivers are aligned to receive clip arms of the optics system. The clip receivers and clip arms are integrated into the package structure and the optics system such that alignment of the clip receivers and clip arms causes alignment of the imaging optics with the image sensor. In the embodiment of FIGS. 4A–4C, the alignment features also serve as the attachment features. That is, the clip arms and clip receivers cause the optics system to be attached to the package structure as well as aligned with the package structure and the image sensor.

The optics system 408 includes a lens holder structure 418, imaging optics 420, and a lens aperture 422. The imaging optics may include one or more lenses as is known in the field of digital image capture. The lens, or lenses, may be made of, for example, plastic or glass and are shaped to direct and focus the desired image bearing light onto the image sensor 410. In an embodiment, the imaging optics and aperture can be adjusted to change parameters such as the field of view, focus, image magnification, and light intensity. In an embodiment, the imaging optics include changeable lens sub-assemblies.

The lens holder structure 418 houses the imaging optics and is connected directly to the image sensor package. The lens holder structure may be made of plastic, metal, or some other material or any combination thereof, as is known in the field of optics systems.

The lens holder structure 418 is designed to create a connection between the lens holder structure and the package structure 402 that is light-tight and that accurately aligns the imaging optics 420 with the image sensor 410. In order to create a connection that is light-tight and that accurately aligns the imaging optics with the image sensor, the lens holder structure includes the contact surface 458, or surfaces, and attachment features 460 that are complementary to the above-described contact surface(s) and attachment features of the package structure. The lens holder structure may also include alignment features that help to accurately align the lens holder structure to the package structure. Some portions of the lens holder structure may serve multiple roles, such as part contact surface and part attachment feature, or part alignment feature and part attachment feature.

The contact surface, or surfaces, 458 of the lens holder structure 418 is a surface that is formed to create a light-tight connection between the package structure 402 and the optics system 408. In an embodiment, the contact surface of the lens holder structure includes a continuous surface around an inner portion of the lens holder structure that is complimentary to the contact surface 452 of the package structure. That is, the contact surface of the lens holder structure fits directly against the contact surface of the package structure. In an embodiment, the contact surface of the lens holder structure may include seals or irregularities, such as dark colored baffles, that ensure a light-tight and secure connection between the image sensor package and the optics system.

The attachment features of the lens holder structure are features that enable the optics system 408 to be securely attached to the image sensor package 416. In an embodiment, the attachment features may include exterior and/or interior features such as clip arms and/or clip receivers that are complementary to the attachment features of the package structure 402. In the embodiment of FIGS. 4A–4C, the lens holder structure 418 includes clip arms 460 on the exterior of the lens holder structure that are formed to mate with the clip receivers 456 of the package structure. It should be noted that although specific attachment features are shown in FIGS. 4A–4C, other arrangements of attachment features may be utilized to attach the optics system to the image sensor package. For example, the package structure 402 may have clip arms and the lens holder may have complementary clip receivers. In an embodiment, the attachment features of the lens holder structure may be separate from the alignment features.

In addition to the complementary attachment features of the package structure 402 and the lens holder structure 418, the optics system may be more securely attached to the package structure by, for example, gluing or welding, after the optics system is initially attached to the package structure by the complementary attachment features. In an embodiment, the complementary attachment features of the package structure and lens holder structure serve to hold the optics system and the package structure together while they are permanently affixed by gluing or welding. For example, clip arms and clip receivers may initially attach the optics system to the package structure while glue is applied and cured, thus ensuring that the glue does not change the alignment of the optics system to the image sensor. In an embodiment, the attachment features may be temporary, or removable, features that are eliminated after the optics system is permanently affixed to the package structure.

The alignment features of the lens holder structure 418 are features that cause the optics system 408 to be accurately aligned with the image sensor 410 once the optics system is attached to the package structure 402. In an embodiment, the alignment features may include mechanical alignment features and/or optical alignment features. Example mechanical alignment features include notches, grooves, flat surfaces, protrusions, etc. that are complementary to mechanical alignment features of the package structure. Example optical alignment features may include optically detectable markings or notches that are optically aligned with complementary features on the package structure. In the embodiment of FIGS. 4A–4C, alignment features of the lens holder structure include clip arms 460 that are aligned to fit into the clip receivers 454 of the package structure. As described above, matching the clip arms to the clip receivers causes the imaging optics to be aligned with the image sensor. In the embodiment of FIGS. 4A–4C, the alignment features also serve as attachment features. That is, the clip arms of the lens holder structure help cause the optics system to be aligned and attached to the package structure.

Because of the high temperatures required for surface mounting components to circuit boards, in an embodiment, the image sensor package 416 is soldered to the circuit board 404 without the optics system 408. In an embodiment, the transparent cover 414 over the image sensor 410 is protected during surface mounting by a temporary protective barrier. The temporary protective barrier, which may be attached to the package structure by the package structure attachment features, is removed from the transparent cover before the optics system is attached to the package structure.

The optics system is attached to the image sensor package after the image sensor package has been soldered to the circuit board, thus preventing the imaging optics 420 from being subjected to potentially damaging high temperatures. In the embodiment of FIGS. 4A–4C, the optics system is clipped directly to the package structure after the image sensor package has been surface mounted to the circuit board. The clip arms 460 of the lens holder structure 418 and the clip receivers 456 of the package structure 402 cause the image sensor 410 to be accurately aligned with imaging optics when the clip arms are fit into the clip receivers. Because the optics system is connected directly to the image sensor package, the optics system does not expand the footprint of the image sensor package.

In an embodiment of the image capture system, the package structure includes at least three alignment features that are complementary to at least three alignment features of the lens holder structure. In an embodiment of the image capture system, the package structure includes at least one attachment feature that is complementary to at least one attachment feature of the lens holder structure.

Preferably, the image sensor package and optics system are assembled utilizing materials and processes that exclude dust and moisture from damaging the image sensor and the imaging optics.

In an embodiment, the image sensor package and optics system are assembled to eliminate air gaps between the internal elements of the image sensor package or between the rear lens element of the optics system and the transparent cover of the image sensor package. In an embodiment, an index matching fluid is placed between the rear lens element of the optics system and the transparent cover of the image sensor package to prevent reflections or other image aberrations.

What is claimed is:

1. A digital image capture system comprising:
    an image sensor;
    a package structure for holding said image sensor, said package structure including attachment means for attaching an optics system to said package structure;
    electrical connectors for creating electrical connections between said image sensor and a circuit board;
    a transparent cover connected to said package structure that encloses said image sensor within a cavity of the package structure; and
    a removable protective barrier, connected to said attachment means, that protects said transparent cover from damage.

2. The digital image capture system of claim 1 wherein said attachment means includes an irregular surface on said package structure for mechanically attaching said optics system to said package structure.

3. The digital image capture system of claim 1 wherein said attachment means includes a recess on said package structure for mechanically attaching said optics system to said package structure.

4. The digital image capture system of claim 1 wherein said attachment means includes a clip receiver integrated with said package structure for mechanically attaching said optics system to said package structure.

5. The digital image capture system of claim 1 wherein said attachment means includes a clip arm integrated with said package structure for mechanically attaching said optics system to said package structure.

6. The digital image capture system of claim 1 wherein said package structure includes a contact surface that is complementary to a contact surface of said optics system.

7. The digital image capture system of claim 6 wherein said contact surface of said package structure is formed to create a light-tight connection with said contact surface of said optics system.

8. The digital image capture system of claim 1 wherein said attachment means causes said optics system to be aligned with said package structure and said image sensor when said optics system is attached to said package structure.

9. The digital image capture system of claim 1 further including an alignment feature integrated into said package structure for aligning said optics system with said image sensor.

* * * * *